US007469576B2

(12) United States Patent  
Kruger

(10) Patent No.: US 7,469,576 B2  
(45) Date of Patent: Dec. 30, 2008

(54) METHOD AND APPARATUS FOR DETERMINING TDC FOR EACH CYLINDER OF A MULTI-CYLINDER INTERNAL COMBUSTION ENGINE

(75) Inventor: Duane D. Kruger, Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 78 days.

(21) Appl. No.: 11/784,124

(22) Filed: Apr. 5, 2007

(65) Prior Publication Data

US 2008/0249677 A1    Oct. 9, 2008

(51) Int. Cl.  
*G01M 15/00* (2006.01)

(52) U.S. Cl. .................... 73/114.28; 73/114.16

(58) Field of Classification Search ............. 73/114.16, 73/114.17, 114.18, 114.22, 114.26, 114.27, 73/114.28  
See application file for complete search history.

(56) References Cited

U.S. PATENT DOCUMENTS

| | | | | |
|---|---|---|---|---|
| 6,367,317 B1* | 4/2002 | Jaye | ............... | 73/114.16 |
| 6,564,623 B2* | 5/2003 | Zanetti | ............... | 73/114.28 |
| 7,117,080 B2* | 10/2006 | Sobel | ............... | 701/114 |
| 2001/0006004 A1* | 7/2001 | Zanetti | ............... | 73/116 |
| 2004/0236496 A1* | 11/2004 | Sobel | ............... | 701/114 |

OTHER PUBLICATIONS

Nilsson, Ylva and Eriksson, Lars; "Determining TDC Position Using Symmetry and Other Methods"; SAE International, 2004 SAE World Congress, Detroit, Michigan, Mar. 8-11, 2004; SAE Technical Paper Series #2004-01-1458.

* cited by examiner

*Primary Examiner*—Eric S McCall  
(74) *Attorney, Agent, or Firm*—Jimmy L. Funke

(57) ABSTRACT

True Top Dead Center (TDC) of an engine piston is determined through determination of the Location of Peak Pressure (LPP) using either of two simplified algorithms. A Heat Loss Offset (HLO), drawn from a look-up table based on engine speed, molar mass of the air being compressed, and heat loss rate to the cylinder walls, is added to the calculated LPP to provide a corrected and true TDC position for each piston, which corrects for errors in target wheel tooth location of a camshaft position sensor and for any misalignment in the target wheel during installation on an engine. Preferably, such a calculation is carried out for each cylinder of a multi-cylinder engine during operation thereof, thus further correcting for machining errors in the crankshaft and for crankshaft bending during the life of the engine. The invention thus allows for more accurate combustion calculations for each individual cylinder.

5 Claims, 4 Drawing Sheets

METHOD AND APPARATUS FOR DETERMINING TDC FOR EACH CYLINDER OF A MULTI-CYLINDER INTERNAL COMBUSTION ENGINE

TECHNICAL FIELD

The present invention relates to internal combustion engines; more particularly, to methods and apparatus for determining piston positions within a cylinder of an internal combustion engine; and most particularly, to method and apparatus for determining true Top Dead Center (TDC) position with respect to a crankshaft position encoder readout for each cylinder in a multiple-cylinder engine.

BACKGROUND OF THE INVENTION

Within the automotive industry, feedback control based on measured cylinder pressure for both spark-ignited (SI) and compression-ignited (CI) internal combustion engines is under development to reduce engine emissions and to improve engine efficiency and vibration performance. A typical pressure control system includes four main components:

a) a high range cylinder compression sensor capable of detecting combustion pressures up to about 200 bar, for a typical diesel engine;

b) an engine position sensor for precise crankshaft position determination; typically, an optical or magnetic encoder mounted on the end of the engine crankshaft;

c) a cylinder pressure controller for receiving the pressure sensor signal and the crank position sensor signal and performing all necessary combustion calculations; and d) an engine control module (computer) that communicates with the cylinder pressure controller and provides the desired feedback control of engine performance parameters; these functions may be combined with those of the cylinder pressure controller in a single computational unit.

The combustion calculations require an accurate knowledge of crankshaft position when pressure readings are taken. It is especially important to know within a small fraction of a degree the true position of TDC in relation to the readout thereof provided by the engine position sensor. One degree in crankshaft position error can result in an approximately 16% error in IMEP calculation.

TDC is defined as the top dead center position of a piston in a cylinder, which thus defines the minimum cylinder volume and maximum cylinder pressure. A first prior art approximation, therefore, has been to determine the rotational position at which the maximum pressure occurs, known in the art as the Location of Peak Pressure (LPP). This approximation is insufficient for modern engines because of small but real dynamic effects including piston blow-by and heat transfer to and from the cylinder wall surfaces during compression and expansion, of which the latter is the more significant. These effects cause LPP to occur slightly ahead of TDC.

In addition, tolerances in manufacturing and attaching the crankshaft sensor mean that the sensor is not an absolutely true indicator of TDC for the first cylinder. Further, because of additional tolerances in manufacturing a crankshaft, the throws may not be rotationally spaced by the exact design angle, meaning that TDC for each cylinder can have a fixed angular bias, either plus or minus, from TDC for the first cylinder.

Methods for determining and compensating for the incongruence of TDC and LPP for an engine generally (for one selected cylinder) have been published in the automotive engineering art. SAE Paper 2004-01-1458 provides a thorough study of five such methods mathematically relating LPP to TDC. A shortcoming of all such methods is that crankshaft variation between the angles of the throws is not accommodated; thus each method provides known optimum combustion for the one engine cylinder to which the encoder is keyed, and ignores the remaining cylinders.

What is needed in the art is a simplified method and apparatus for determining true TDC for an engine cylinder.

What is further needed in the art is such a method applicable individually to each cylinder of a multi-cylinder engine.

It is a principal object of the present invention to provide improved performance of a multi-cylinder internal combustion engine.

SUMMARY OF THE INVENTION

Briefly described, in an improved means for determining true Top Dead Center of an engine piston, the location of Peak Pressure (LPP) is detected using either of two simplified algorithms. A Heat Loss Offset (HLO), drawn from a look-up table based on engine speed, molar mass of the air being compressed, and heat loss rate to the cylinder walls, is then added to the calculated LPP to provide a corrected and true TDC position for each piston to correct for errors in target wheel tooth location of a camshaft position sensor and for any misalignment in the target wheel during installation thereof on an engine. Preferably, such a calculation is carried out for each cylinder of a multi-cylinder engine during operation thereof, thus further correcting for machining errors in the crankshaft and for crankshaft bending during the life of the engine. The invention thus allows for accurate combustion calculations for each individual cylinder, rather than being limited to a single designated cylinder as in the prior art.

BRIEF DESCRIPTION OF THE DRAWINGS

The present invention will now be described, by way of example, with reference to the accompanying drawings, in which.

The exemplifications set out herein illustrate preferred and exemplary embodiments of the invention, and such exemplifications are not to be construed as limiting the scope of the invention in any manner.

DESCRIPTION OF THE PREFERRED EMBODIMENTS

The present invention uses a pressure sensor signal output from each cylinder of a multiple-cylinder internal combustion engine to calculate the angular offset of each cylinder's TDC location relative to the crankshaft sensor output. This individual cylinder TDC alignment thus accounts for any machining errors or tooth errors on the position sensor. The invention therefore gives an accurate measurement of each piston's position and thereby allows for accurate calculation of combustion statistics, providing better feedback control of the engine as compared to previous methods.

Figure 1:
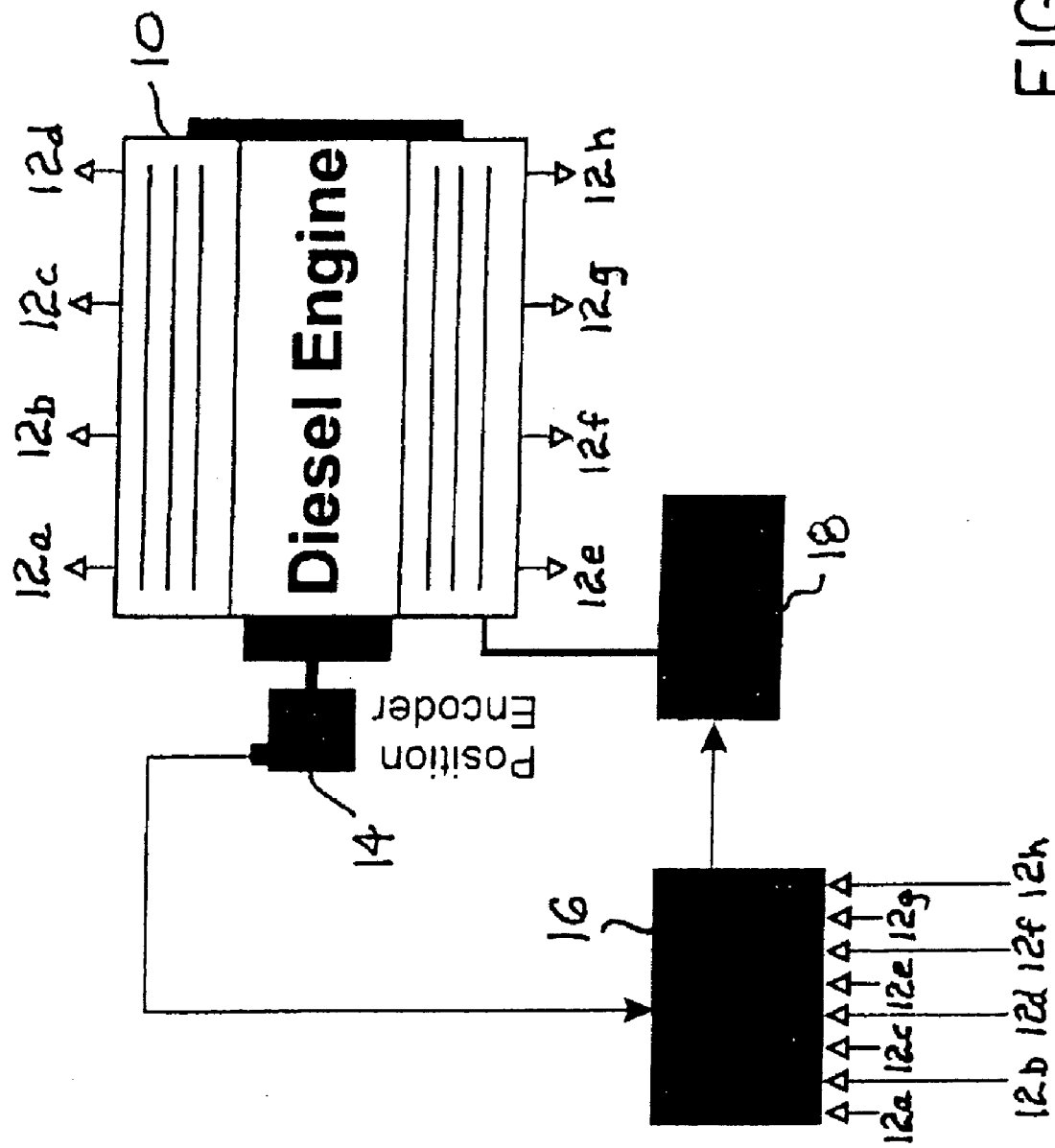
FIG. 1 is a schematic drawing of a combustion control system in accordance with the invention for a V-8 diesel engine.

Referring to FIG. 1, a V8 diesel engine 10 includes cylinder pressure sensors 12a-12h disposed in the firing chambers of the eight cylinders, respectively. A crankshaft angular position sensor (encoder) 14 is mounted on the end of the engine crankshaft to continuously indicate the angular position thereof during operation of the engine. A cylinder pressure controller 16 receives signals from the individual pressure sensors 12a-12h and also from the crankshaft sensor 14 and performs combustion calculations for each cylinder in the engine firing sequence. An engine control module 18 provides overall monitoring and control of all engine functions, including, for example, fuel injector timing and duty cycle, and feeds back relevant engine data to controller 16 for making the combustion calculations. If desired, the functions of controller 16 may be incorporated into ECM 18, although the architecture as shown in FIG. 1 permits addition of the functions of the invention into a new engine without significant revision of the ECM. Also, for exemplary purposes the engine shown is a diesel V8, but the invention is applicable to any form of spark-ignited or compression-ignited engine.

The pressure transducer signal, during a compression-only (that is, non-firing) cycle, can be used to determine crankshaft alignment and thus true TDC. (SAE Paper 2004-01-1458 is a thorough study of many of these methods.) A "TDC find" method consists of two steps: First, find the Location of Peak Pressure (LPP). Second, compute the engine specific angle offset between peak pressure and actual TDC location due principally to heat loss to the cylinder walls:

TDC Location=LPP+Heat Loss Offset  (Equation 1)

Heat Loss Offset (HLO) is calculated using computer simulation methods and parameters for a specific engine, as described in detail below, and is used to construct lookup tables in terms of engine speed and (intake) manifold absolute pressure (MAP). These tables are then installed into controller 16 for use during actual engine operation.

In the present invention, LPP is calculated for each cylinder in one of two ways, either by Continuity of the Polytropic Coefficient or by Wave Form Symmetry Extrapolation. Both of these methods in the present invention include improvements or simplifications of the calculations disclosed in the above-referenced SAE Paper.

Figures 2, 3:
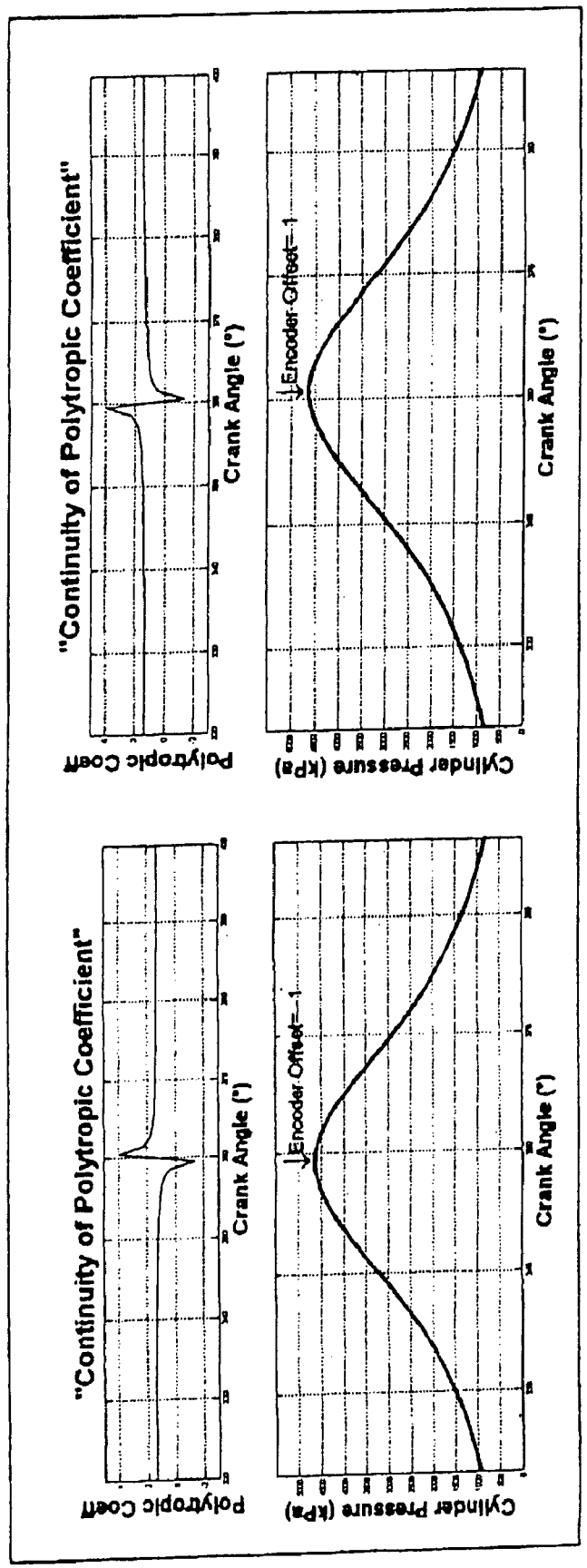
FIG. 2 is a graph showing polytropic coefficient and cylinder pressure for an engine wherein LPP is ahead of the indicated TDC.
FIG. 3 is a graph showing polytropic coefficient and cylinder pressure for an engine wherein LPP is after the indicated TDC.

Referring to FIGS. 2 and 3, Continuity of Polytropic Coefficient can be calculated from the pressure signal and calculated volume information.

The equation used is:

$$P_1 V_1^n = P_2 V_2^n \text{ or } n = \frac{\log(P)}{\log(dV)} \quad \text{(Equation 2)}$$

where
P=Pressure
V=Calculated Cylinder Volume
n=Polytropic Coefficient
dV=Volume/((Bore/2)^2×pi×Stroke)/(Compression Ratio−1)=Volume/minimum(Volume).

If the calculated volume information is not properly aligned with the pressure curve, the calculation of polytropic coefficient near LPP becomes discontinuous, as shown in the upper curves of FIGS. 2 and 3. As the change in volume nears zero, in the vicinity of TDC, any change in pressure that is not caused by the changing volume is reflected as a changing polytropic coefficient. Notice that with any misalignment the polytropic coefficient becomes discontinuous near the peak and that the direction of the polytropic curve is reversed with opposite misalignment. This value can be used to determine peak pressure alignment location by calculating polytropic coefficient just before LPP and just after LPP at equal angles from the peak. If these polytropic coefficients are not equal and the value before LPP is less than the value after LPP, then the piston position is too early and must be retarded.

In accordance with the invention, this method can be further simplified from equation 3 to equation 4 to save on computer computational throughput. Since the control is driving the before and after polytropic coefficients to the same value, the log calculation is not needed.

If $n_{before}=n_{after}$, it means that the pressure curve is aligned with the volume curve. Therefore, since $$n = \frac{\log(P)}{\log(dV)}, \text{ thus } \frac{\log(P_{before})}{\log(dV_{before})} = \frac{\log(P_{after})}{\log(dV_{after})} \quad \text{(Equation 3)}$$

Therefore, $$\frac{P_{before}}{dV_{before}} = \frac{P_{after}}{dV_{after}} \quad \text{(Equation 4)}$$

This expression is simplified from the prior art expression in that it cancels the logarithms and thus requires significantly less computational power and time in evaluation during engine operation.

Figure 4:
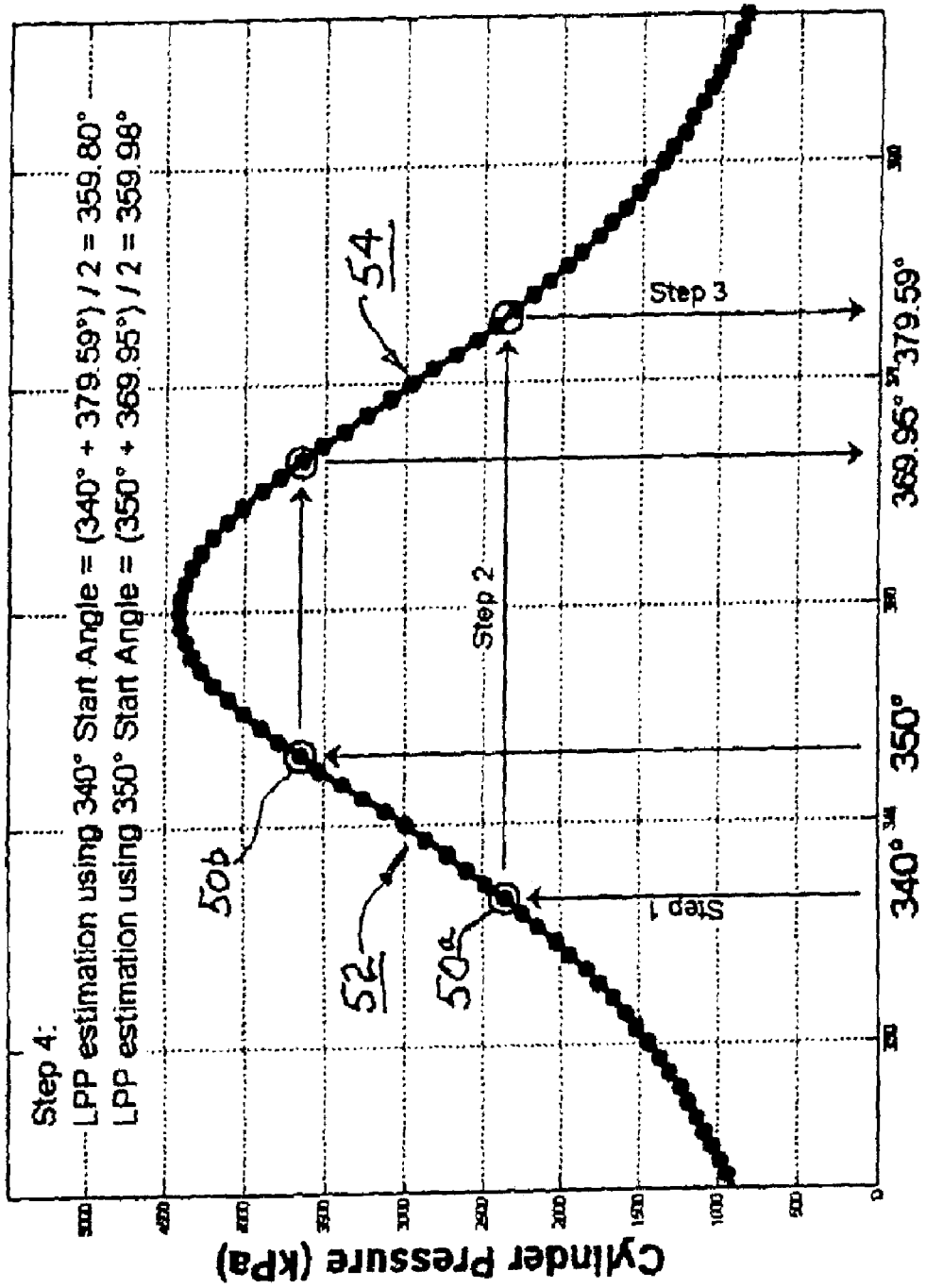
FIG. 4 is a graph illustrating the determination of LPP via symmetry and extrapolation to a peak.

Referring to FIG. 4, the location of peak pressure (LPP) can be calculated by using the prior art steps outlined. Step 1: Find the pressure 50a,50b at a chosen angle(s) on the compression side 52 of the motoring waveform. FIG. 4 shows two such chosen angles at 340° and 350°, corresponding to pressures 50a,50b, respectively. Step 2: Find the same pressure that occurs on the expansion side 54. (The exact pressure on the expansion side may occur between two pressure samples.) Step 3: Determine the expansion angle where the pressure is located using a linear interpolation. Step 4: Once both angles (compression and expansion) are known, calculate the center point between these angles to determine estimated location of LPP. Notice that the LPP prediction @ 340° is less than the LPP prediction @ 350°. This is because there is a shift in LPP due to pressure loss from heat transfer to the cylinder walls. To minimize the angle shift due to heat loss, the chosen angle nearer to the peak is desired. Unfortunately, real-world pressure sensor noise makes this near-peak calculation difficult or unreliable. Any angle within 5° of the peak is to be avoided.

Figure 5:
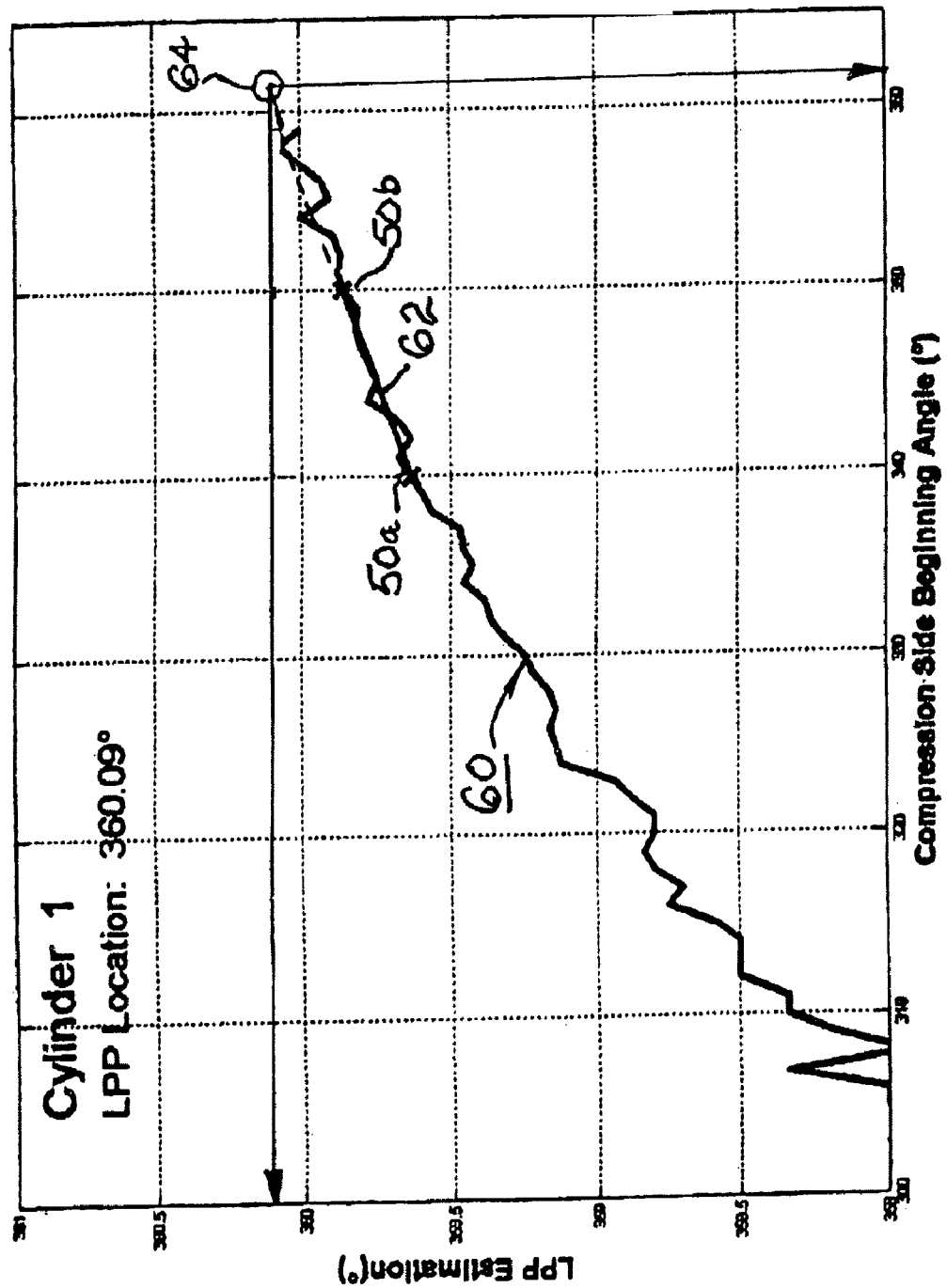
FIG. 5 is a graph showing determination of center point by extrapolation of the compression signal.

Referring to FIG. 5, the present invention uses data points lower in the pressure curve, where a lower signal to noise ratio occurs, coupled with extrapolation higher in the pressure curve to determine LPP. Curve 60 is the calculated LPP prediction from FIG. 4 at each compression side beginning angle between 300° and 358°. Pressures 50a and 50b discussed hereinabove are shown as the end points of the straight line segment 62. In accordance with the present invention, the black circle 64 represents LPP and is found by linear extrapolation of line segment 62 until the LPP estimation is the same value as the compression side beginning angle.

The equation for determining LPP from the extrapolated line is:

$$LPP = \frac{Y_{340} - \left(\frac{X_{340}}{X_{340} - X_{350}}\right)(Y_{340} - Y_{350})}{1 - \frac{(Y_{340} - Y_{350})}{(X_{340} - X_{350})}} = \frac{Y_{intercept}}{(1 - Slope)} \quad \text{(Equation 5)}$$

From the observed shape of the curve 60, a linear approximation can be used near the peak. The linear approximation requires only two LPP estimation calculations, at the pressures 50a and 50b. If desired, a higher order approximation can be used for improved accuracy. However, this requires more LPP estimations and more complex calculations resulting in more computer processor throughput requirements.

Piston Top Dead Center (TDC) is where the piston is at its highest position and the combustion chamber volume is at its minimum. As the piston moves closer to TDC, the gases compress and therefore the pressure and temperature increase. At some angle just before TDC, the increase in pressure due to the changing volume is equal to the decrease in pressure due to heat loss and cylinder leakage. This angle is where LPP is located. (If there were no heat or mass losses, LPP would equal location of TDC.) The majority of the pressure loss is from heat loss to the cylinder walls. The difference in angle between LPP and TDC is defined as Heat Loss Offset (HLO). HLO can be calculated using a theoretical model of the engine. This offset angle is affected by engine speed, molar mass of the air being compressed, and heat loss rate to the cylinder walls, Q, defined as:

$$Q = hA(T_g - T_w) \quad \text{(Equation 6)}$$

where
Q=Heat Loss to cylinder walls
h=heat transfer coefficient
A=exposed combustion chamber surface area
$T_g$=temperature of the cylinder gas
$T_w$=cylinder wall temperature (assumed to be 200° C.)

The industry standard model for calculating the heat transfer coefficient is the Woschni method:

$$h = 3.26 B^{-0.2} P^{0.8} T^{-0.55} v^{0.8} \quad \text{(Equation 7)}$$

where
B=Cylinder Bore (m)
P=Cylinder Pressure (Pa)
T=Gas Temperature in Cylinder (° K)
v=average cylinder gas velocity $$v = c_1 Sp + c_2 \frac{V_d T_r}{P_r V_r}(p - p_m) \quad \text{(Equation 8)}$$

where
$C_1$=2.28;
$C_2$=0 (for motoring waveform)
Sp=2*Stroke*Engine Speed(RPM)*2*pi/60=Mean Piston Speed.

Once the heat loss is determined, the pressure and temperature of the compressed gases can be calculated using thermodynamic properties of air. The new shape of the pressure curve can then be used to determine LPP. Since the location of TDC using the theoretical model is known, HLO can be calculated from the difference in angle between LPP and TDC. Engine speed and initial pressure (MAP) affect the amount of heat loss and therefore the shape of the pressure curve. This will ultimately dictate where LPP is located. From this engine model, a lookup table is generated with engine speed and MAP as inputs and HLO as an output.

Thus, during engine operation, equation 1 is used to determine true TDC for each cylinder during each firing cycle of the engine.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for determining Top Dead Center rotational location of a piston in a cylinder of a multiple-cylinder internal combustion engine having a pressure sensor in the cylinder and having a crankshaft rotational position sensor, comprising the steps of:

a) determining the rotational Location of Peak Pressure in said cylinder with respect to the indicated rotational location of said crankshaft position sensor by a procedure selected from the group consisting of determining Continuity of Polytropic Coefficient and determining Waveform Symmetry extrapolated to a peak, wherein said determining of Location of Peak Pressure by determining Continuity of Polytropic Coefficient includes the algorithm $$\frac{P_{before}}{dV_{before}} = \frac{P_{after}}{dV_{after}},$$

and wherein said determining of Location of Peak Pressure by determining Waveform Symmetry extrapolated to a peak includes the extrapolation algorithm $$LPP = \frac{Y_{340} - \left(\frac{X_{340}}{X_{340} - X_{350}}\right)(Y_{340} - Y_{350})}{1 - \frac{(Y_{340} - Y_{350})}{(X_{340} - X_{350})}} = \frac{Y_{intercept}}{(1 - Slope)};$$

and b) adding a calculated Heat Loss Offset to said determined Location of Peak Pressure to provide said Top Dead Center rotational location of said piston in said cylinder.

2. A method in accordance with claim 1 wherein said Heat Loss Offset is determined from lookup tables stored in a computer of said engine, and wherein said Heat Loss Offset tables are derived from engine operating variables including engine speed and intake manifold absolute pressure.

3. A method in accordance with claim 1 wherein each of said cylinders of said multiple-cylinder internal combustion engine is provided with a pressure sensor, and wherein each of steps a) and b) is performed for each of said cylinders during each full firing rotational cycle of said engine, such that said Top Dead Center rotational location is determined for each piston in each cylinder in its firing sequence.

4. A system for determining Top Dead Center rotational locations of the pistons in a plurality of cylinders of a multiple-cylinder internal combustion engine, comprising:

a) a plurality of pressure sensors disposed one each of in said plurality of cylinders for providing a plurality of independent pressure signals from each of said plurality of cylinders;

b) a crankshaft position sensor for sending signals indicative of rotational position of said crankshaft; and c) computational means for receiving said pressure signals and said rotational position signals and various other signals indicative of engine operating parameters, said computational means being programmed with lookup tables for calculating a Heat Loss Offset for each of said plurality of cylinders, and said computational means being further programmed with algorithms for determining the rotational Location of Peak Pressure in each of said plurality of cylinders with respect to the indicated rotational location of said crankshaft position sensor by a procedure selected from the group consisting of determining Continuity of Polytropic Coefficient and determining Waveform Symmetry extrapolated to a peak, wherein said determining of Location of Peak Pressure by determining Continuity of Polytropic Coefficient includes the algorithm $$\frac{P_{before}}{dV_{before}} = \frac{P_{after}}{dV_{after}},$$

and wherein said determining of Location of Peak Pressure by determining Waveform Symmetry extrapolated to a peak includes the extrapolation algorithm $$LPP = \frac{Y_{340} - \left(\frac{X_{340}}{X_{340} - X_{350}}\right)(Y_{340} - Y_{350})}{1 - \frac{(Y_{340} - Y_{350})}{(X_{340} - X_{350})}} = \frac{Y_{intercept}}{(1 - Slope)}.$$

5. An internal combustion engine having a plurality of combustion cylinders, said engine comprising a system for determining Top Dead Center rotational locations of each of the pistons in said plurality of cylinders, wherein said system includes a plurality of pressure sensors disposed one each in said plurality of cylinders for providing a plurality of independent pressure signals, a crankshaft position sensor for sending signals indicative of rotational position of said crankshaft, and computational means for receiving said pressure signals and said rotational position signals and various other signals indicative of engine operating parameters, said computational means being programmed with lookup tables for calculating a Heat Loss Offset for each of said plurality of cylinders, and said computational means being further programmed with algorithms for determining the rotational Location of Peak Pressure in each of said plurality of cylinders with respect to the indicated rotational location of said crankshaft position sensor by a procedure selected from the group consisting of determining Continuity of Polytropic Coefficient and determining Waveform Symmetry extrapolated to a peak, wherein said determining of Location of Peak Pressure by determining Continuity of Polytropic Coefficient includes the algorithm $$\frac{P_{before}}{dV_{before}} = \frac{P_{after}}{dV_{after}},$$

and wherein said determining of Location of Peak Pressure by determining Waveform Symmetry extrapolated to a peak includes the extrapolation algorithm $$LPP = \frac{Y_{340} - \left(\frac{X_{340}}{X_{340} - X_{350}}\right)(Y_{340} - Y_{350})}{1 - \frac{(Y_{340} - Y_{350})}{(X_{340} - X_{350})}} = \frac{Y_{intercept}}{(1 - Slope)}.$$

* * * * *